(12) United States Patent
Schiller et al.

(10) Patent No.: US 10,984,682 B2
(45) Date of Patent: Apr. 20, 2021

(54) PRODUCT PIERCING TAG

(71) Applicant: Bedford Industries, Inc., Worthington, MN (US)

(72) Inventors: David Schiller, Sioux Falls, SD (US); Jay Milbrandt, Worthington, MN (US)

(73) Assignee: Bedford Industries, Inc., Worthington, MN (US)

( * ) Notice: Subject to any disclaimer, the term of this patent is extended or adjusted under 35 U.S.C. 154(b) by 0 days.

(21) Appl. No.: 16/774,314

(22) Filed: Jan. 28, 2020

(65) Prior Publication Data

US 2020/0273376 A1 Aug. 27, 2020

Related U.S. Application Data

(60) Provisional application No. 62/810,459, filed on Feb. 26, 2019.

(51) Int. Cl.
*G09F 3/02* (2006.01)
*B32B 7/12* (2006.01)
(Continued)

(52) U.S. Cl.
CPC .................. *G09F 3/02* (2013.01); *B32B 7/12* (2013.01); *B32B 27/08* (2013.01); *B32B 27/32* (2013.01);
(Continued)

(58) Field of Classification Search
CPC ..... G09F 3/02; G09F 3/04; G09F 3/13; G09F 3/12; G09F 3/14; B32B 27/32;
(Continued)

(56) References Cited

U.S. PATENT DOCUMENTS 143,621 A 10/1873 Goodridge
302,495 A 7/1884 Jenkins
(Continued)

FOREIGN PATENT DOCUMENTS

EP 2808840 A1 12/2014
FR 2642266 A1 8/1990
(Continued)

OTHER PUBLICATIONS

The International Search Report and the Written Opinion of the International Searching Authority for corresponding International Patent Application No. PCT/US2020/015543, dated May 12, 2020.
(Continued)

*Primary Examiner* — Cassandra Davis
(74) *Attorney, Agent, or Firm* — Mai-Tram D. Lauer; Westman, Champlin & Koehler, P.A.

(57) ABSTRACT

A tag is configured to be inserted into a product. The tag includes a label portion and an insertion portion. The label portion has a first width. The insertion portion extends from the label portion, has a second width that is less than the first width, and has a length. An elongated wire extends along the length of the insertion portion to at least a part of the label portion. The tag has sufficient rigidity to enable a user to hold the label portion and force the insertion portion into the product. In another aspect, a method of attaching a tag to a product is described. The method includes holding the label portion and forcing the insertion portion into the product.

17 Claims, 7 Drawing Sheets

(51) Int. Cl.
  *B32B 27/08* (2006.01)
  *B32B 27/32* (2006.01)
  *G09F 3/04* (2006.01)

(52) U.S. Cl.
  CPC .......... *G09F 3/04* (2013.01); *B32B 2307/536* (2013.01); *B32B 2519/00* (2013.01)

(58) Field of Classification Search
  CPC ....... B32B 27/08; B32B 7/12; B32B 2519/00; B32B 2307/536; B65C 7/001; B65C 7/003; A22C 17/10
  See application file for complete search history.

(56) References Cited

U.S. PATENT DOCUMENTS

| | | | |
|---|---|---|---|
| 310,785 A | 1/1885 | Brewster | |
| 806,229 A | 12/1905 | Young | |
| 949,570 A | 2/1910 | Harris | |
| 1,073,828 A | 9/1913 | Wallin | |
| 1,160,035 A * | 11/1915 | Bishop | G09F 3/12 40/669 |
| 1,248,047 A | 11/1917 | Woolley | |
| 2,012,990 A * | 9/1935 | Choate | G09F 3/12 40/645 |
| 2,097,965 A | 11/1937 | Caulk, Jr. | |
| 2,165,672 A | 7/1939 | Weimont | |
| 2,257,505 A * | 9/1941 | Lichter | G09F 3/12 294/5 |
| 2,554,105 A | 5/1951 | Heinle | |
| 2,850,820 A | 9/1958 | Lersch | |
| 2,859,685 A * | 11/1958 | Alexander | A47J 37/04 99/419 |
| 2,879,617 A * | 3/1959 | Popeil | A41G 1/00 264/245 |
| 2,973,597 A | 3/1961 | Powell | |
| 2,973,798 A | 3/1961 | Powell | |
| 3,290,854 A | 12/1966 | MacMurray | |
| 3,370,328 A | 2/1968 | Hilton | |
| 3,409,948 A | 11/1968 | Goodwin | |
| 3,426,393 A | 2/1969 | Mead | |
| 3,706,147 A | 12/1972 | Glaser | |
| 3,721,028 A | 3/1973 | Lehner | |
| 3,808,646 A | 5/1974 | Brumlik | |
| 3,882,573 A | 5/1975 | Thomas, Jr. | |
| 3,973,294 A | 8/1976 | Pfizenmaier | |
| 4,407,082 A * | 10/1983 | Stehouwer | G09F 3/14 156/73.1 |
| 4,415,522 A | 11/1983 | Capaccio et al. | |
| 4,731,943 A | 3/1988 | Schlicter | |
| 4,800,121 A | 1/1989 | Ohta et al. | |
| 4,948,202 A | 8/1990 | Helseth | |
| 5,005,264 A | 4/1991 | Breen | |
| 5,154,964 A | 10/1992 | Iwai et al. | |
| 5,232,431 A | 8/1993 | Helseth | |
| 5,238,631 A | 8/1993 | Stolk et al. | |
| 5,342,687 A | 8/1994 | Iwai et al. | |
| 5,395,471 A | 3/1995 | Obijeski et al. | |
| 5,607,748 A | 3/1997 | Feltman | |
| 5,674,342 A | 10/1997 | Obijeski et al. | |
| 5,732,495 A | 3/1998 | Lowe et al. | |
| 5,961,434 A | 10/1999 | Helseth | |
| 6,085,452 A * | 7/2000 | Davis | G01C 15/06 116/209 |
| 6,226,911 B1 | 5/2001 | Wescombe | |
| 6,372,068 B1 | 4/2002 | Kincel et al. | |
| 6,663,809 B1 | 12/2003 | Haddock et al. | |
| 6,673,413 B1 | 1/2004 | Kincel et al. | |
| 6,799,389 B2 | 10/2004 | Wolfgang | |
| 7,011,879 B1 | 3/2006 | Contreras et al. | |
| 7,281,345 B2 | 10/2007 | Ludlow et al. | |
| 7,363,686 B2 | 4/2008 | Fukuyasu et al. | |
| 7,631,447 B2 * | 12/2009 | Morton | G09F 15/00 116/209 |
| 7,736,564 B2 | 6/2010 | Sakamoto et al. | |
| 7,811,673 B2 | 10/2010 | Sakamoto et al. | |
| 8,065,856 B2 * | 11/2011 | Carrette | G01C 15/04 53/120 |
| 8,136,471 B1 * | 3/2012 | Carrette | G09F 17/00 116/173 |
| 9,403,610 B2 | 8/2016 | O'Donnell et al. | |
| 9,796,514 B2 | 10/2017 | Buselli | |
| 9,947,247 B2 | 4/2018 | Milbrandt et al. | |
| 10,118,430 B2 | 11/2018 | O'Donnell et al. | |
| 10,322,600 B2 | 6/2019 | O'Donnell et al. | |
| 2006/0150456 A1 | 7/2006 | Sar-El et al. | |
| 2006/0185208 A1 | 8/2006 | Kubota et al. | |
| 2007/0039219 A1 * | 2/2007 | Wallace | G09F 3/12 40/645 |
| 2007/0190321 A1 | 8/2007 | Sakamoto et al. | |
| 2008/0100055 A1 * | 5/2008 | Loomis | G09F 3/14 283/74 |
| 2008/0136887 A1 | 6/2008 | Schmitt et al. | |
| 2010/0088939 A1 | 4/2010 | Maniwa | |
| 2011/0146124 A1 * | 6/2011 | Carlson | G09F 3/206 40/645 |
| 2014/0217718 A1 * | 8/2014 | O'Donnell | G09F 3/06 283/81 |
| 2016/0303888 A1 | 10/2016 | O'Donnell et al. | |
| 2017/0259969 A1 | 9/2017 | Helseth | |
| 2018/0194154 A1 | 7/2018 | O'Donnell et al. | |
| 2019/0255873 A1 | 8/2019 | O'Donnell et al. | |
| 2020/0043380 A1 * | 2/2020 | Huntington | G09F 7/22 |

FOREIGN PATENT DOCUMENTS

| | | |
|---|---|---|
| GB | 326360 A | 3/1930 |
| GB | 899471 A | 6/1962 |
| JP | 53003483 A | 1/1978 |
| KR | 1020120002709 A | 1/2012 |

OTHER PUBLICATIONS

"Arrow Tag identification arrow", Precintia International S.A., https://en.precintia.com/product/arpon-identificativo-arrow-tag/, 5 pages, obtained Jul. 16, 2018.

"Productos De Seguridad", Precintia International S.A., 2018 Product Cataloa, 29 Pages, obtained Jul. 18, 2018.

* cited by examiner

PRODUCT PIERCING TAG

CROSS REFERENCE TO RELATED APPLICATION

This application claims the benefit of priority of U.S. Provisional Patent Application No. 62/810,459 filed Feb. 26, 2019 for "Product Piercing Tag;" the priority application is hereby incorporated by reference in its entirety.

BACKGROUND

The present disclosure is directed to tags for labeling merchandise, and more particularly to tags bearing printed information and formed with a relatively rigid, elongated element for insertion into a merchandise product.

Labeling or marking of merchandise with printed matter is often desirable to provide information to various entities in the production, transportation, and marketing channels as well as to the ultimate consumer. The printed matter may provide information regarding merchandise identification and price and may take the form of, for example, machine readable or scannable material (such as codes comprised of bars or characters) and human readable material (such as characters and graphical or pictorial matter).

SUMMARY

An aspect of the present disclosure is directed to a tag configured to be inserted into a product. The tag includes a label portion and an insertion portion. The label portion has a first width. The insertion portion extends from the label portion, has a second width that is less than the first width, and has a length. An elongated wire extends along the length of the insertion portion to at least a part of the label portion. The tag has sufficient rigidity to enable a user to hold the label portion and force the insertion portion into the product.

In another aspect, a method of attaching a tag to a product is described. The method includes holding the label portion and forcing the insertion portion into the product.

This disclosure, in its various combinations, may also be characterized by the following listing of items:
1. A tag configured to be inserted into a product, the tag including:
   a label portion having a first width;
   an insertion portion:
      extending from the label portion;
      having a second width that is less than the first width; and
      having a length;
   wherein an elongated wire extends along the length of the insertion portion to at least a part of the label portion;
   the tag having sufficient rigidity to enable a user to hold the label portion and force the insertion portion into the product.
2. The tag of item 1 including indicia disposed on the label portion.
3. The tag of any of items 1-2 including first indicia disposed on a first surface of the label portion and second indicia disposed on a second opposing surface of the label portion.
4. The tag of any of items 1-3 wherein the label portion and insertion portion are integrally fabricated from a first sheet and a polymeric layer adhered to the first sheet such that the wire is encased within the polymeric layer.
5. The tag of item 4 including a second sheet adhered to the polymeric layer opposite the first sheet.
6. The tag of item 5 wherein at least one of the first sheet and second sheet includes a polymer.
7. The tag of any of items 4-6 wherein the polymeric layer is formed from a material having a hardness range of about 90 Rockwell R to about 110 Rockwell R.
8. The tag of any of items 1-7, wherein the wire exhibits a dead-fold property.
9. The tag of any of items 1-8 wherein the insertion portion includes an arrow-shaped head.
10. The tag of any of items 1-9 wherein the label portion is symmetric about the wire.
11. The tag of any of items 1-10 wherein the wire has a tensile strength in a range of about 90 ksi to about 125 ksi.
12. A method of attaching a tag to a product, the tag including:
   a label portion having a first width;
   an insertion portion:
      extending from the label portion;
      having a second width that is less than the first width; and
      having a length;
   wherein an elongated wire extends along the length of the insertion portion to at least a part of the label portion;
   the method including:
      holding the label portion; and
      forcing the insertion portion into the product.
13. The method of item 12 including bending the tag at a transition area between the label portion and the insertion portion to change an orientation of the label portion with respect to the product.
14. The method of item 13 wherein the bending is performed along a bending axis that is substantially perpendicular to the length of the insertion portion.
15. The method of any of items 12-14 wherein a puncture load of forcing the insertion portion into the product is in a range of about 1.5 pounds to about 2.5 pounds.

This summary is provided to introduce concepts in simplified form that are further described below in the Detailed Description. This summary is not intended to identify key features or essential features of the disclosed or claimed subject matter and is not intended to describe each disclosed embodiment or every implementation of the disclosed or claimed subject matter. Specifically, features disclosed herein with respect to one embodiment may be equally applicable to another. Further, this summary is not intended to be used as an aid in determining the scope of the claimed subject matter. Many other novel advantages, features, and relationships will become apparent as this description proceeds. The figures and the description that follow more particularly exemplify illustrative embodiments.

BRIEF DESCRIPTION OF THE DRAWINGS

The disclosed subject matter will be further explained with reference to the attached figures, wherein like structure or system elements are referred to by like reference numerals throughout the several views. It is contemplated that all descriptions are applicable to like and analogous structures throughout the several embodiments.

While the above-identified figures set forth one or more embodiments of the disclosed subject matter, other embodiments are also contemplated, as noted in the disclosure. In all cases, this disclosure presents the disclosed subject matter by way of representation and not limitation. It should be understood that numerous other modifications and embodiments can be devised by those skilled in the art that fall within the scope of the principles of this disclosure.

The figures may not be drawn to scale. In particular, some features may be enlarged relative to other features for clarity. Moreover, where terms such as above, below, over, under, top, bottom, side, right, left, vertical, horizontal, etc., are used, it is to be understood that they are used only for ease of understanding the description. It is contemplated that structures may be oriented otherwise.

DETAILED DESCRIPTION

A tag of the present disclosure includes a label portion and an insertion portion and may be used in a variety of agricultural production, other commercial, educational, retail, and decorative applications. For example, while the illustrations show use of exemplary tags with a produce product, the tags may also be used with other products amenable to insertion of a tag, including, for example, meat products, household goods, and other items. Other contemplated applications for tag 20 include use in agronomy as a soil sample marker or plant marker; use as a decorative spike for desserts, cakes, cheese and other baked or food items; use as an organ or other identifier on cadavers for educational anatomy laboratories; and use as labels for penetrable products such as candles and other wax products. When referring to a specific embodiment of a tag, a letter may follow the reference numeral 20. When referring to a tag of the disclosure in general, the description may state "tag 20."

Figure 1:
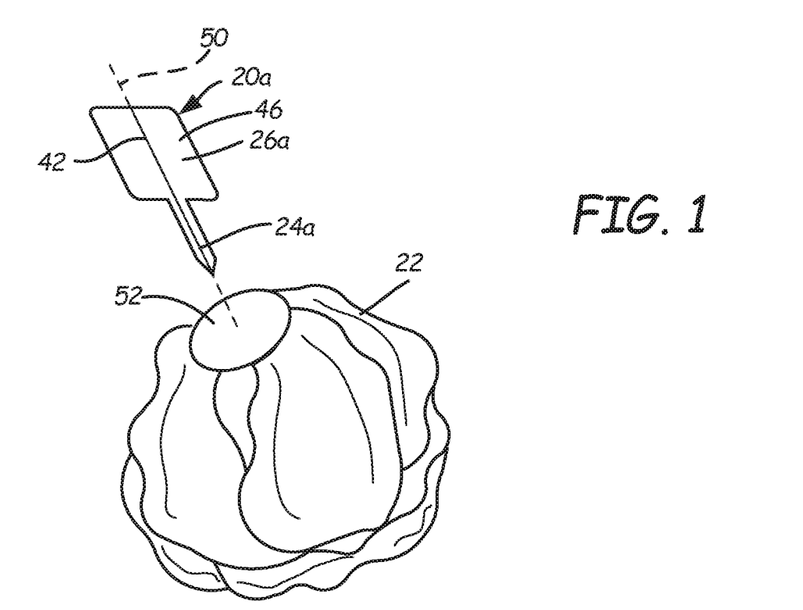
FIG. 1 is a perspective view of an exemplary embodiment of a product piercing tag aligned for insertion into a portion of a product.

FIG. 1 is a perspective view of a first exemplary embodiment of a product piercing tag 20a positioned proximate a food product 22. In the illustrated embodiment, product 22 is a cabbage head; however, it is contemplated that tag 20 can be used with many forms of products or articles having a penetrable outer surface. Tag 20a includes an integrally formed label portion 26a and insertion portion 24a. A rear surface 46 of tag 20a is visible. Label portion 26a is configured to display indicia 28 thereon, such as on rear surface 46 and/or front surface 44 (shown in FIG. 2), for example. Label portion 26 may also serve as a handle for manually holding and forcing insertion portion 24a into product 22.

Figure 2:
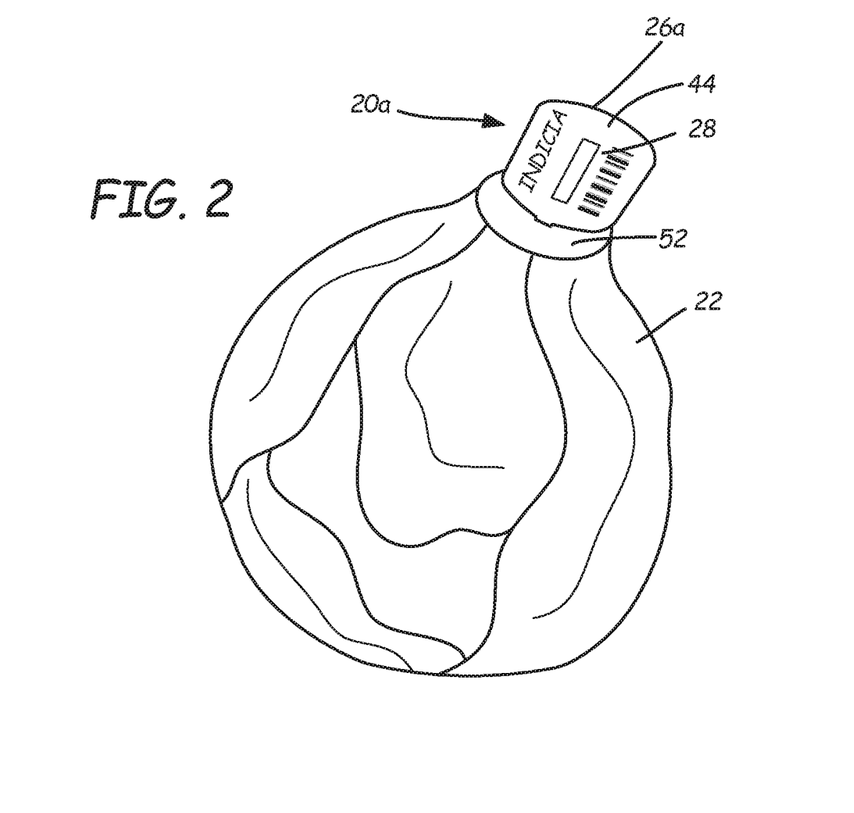
FIG. 2 is a perspective view of the product with the tag inserted into a portion thereof.
Figure 3:
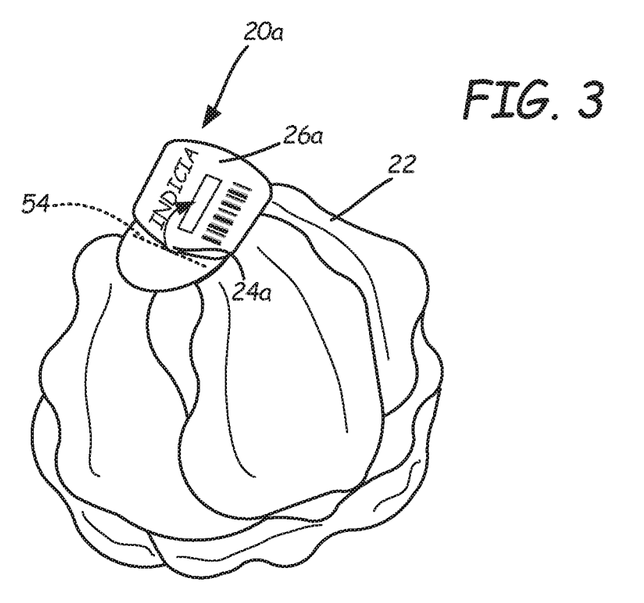
FIG. 3 is similar to FIG. 2 but shows bending of the tag after insertion of the tag into a product.
Figure 4:
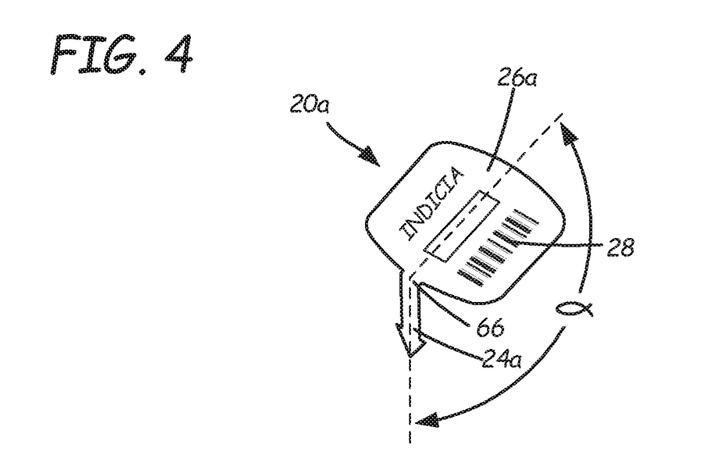
FIG. 4 is a perspective view of the tag in a bent configuration and removed from the product.
Figure 5A:
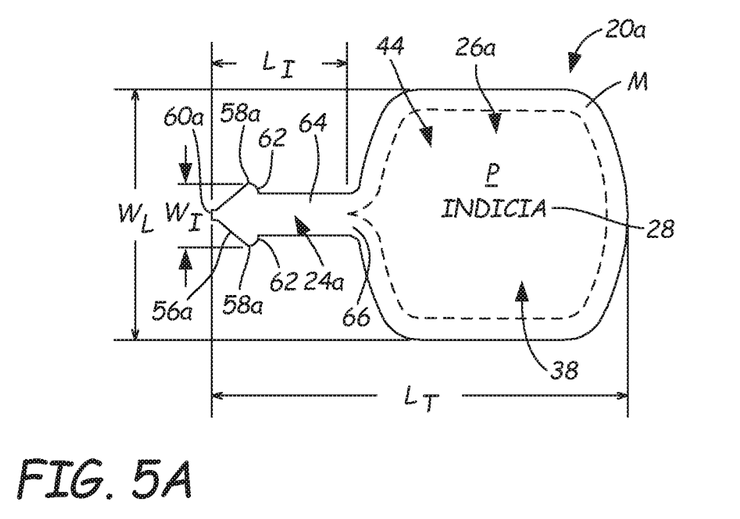
FIG. 5A is a front view of the tag of FIGS. 1-4.
Figure 5B:
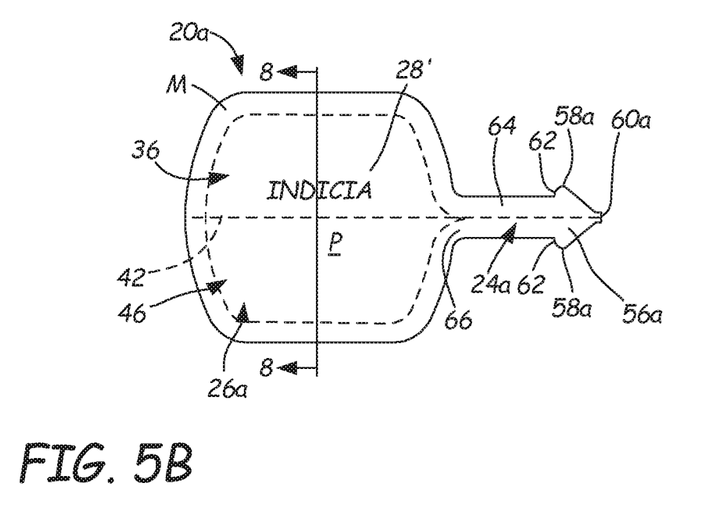
FIG. 5B is a rear view of the tag of FIGS. 1-4 and 5A.

As shown in FIG. 2, insertion portion 24a has been forced into a portion of product 22. In the illustrated example, insertion portion 24a is no longer visible, yet label portion 26a with indicia 28 thereon remains visible. Compared to the side perspective view of FIG. 2, FIG. 3 is a top perspective view of product 22, wherein label portion 26a has been bent with respect to insertion portion 24a. FIG. 4 is a perspective view of the tag 20a of FIG. 3 removed from product 22 to illustrate the bent configuration. In this example, tag 20a is bent so that portions 24a and 26a are disposed at an angle α relative to each other that is approximately a right angle (about 90 radial degrees). In conjunction with any particular display application, a user may choose to retain tag 20 in a flat configuration or bend it into various configurations so that label portion 26 and indicia 28 have a desired orientation with respect to product 22.

FIG. 1 is a perspective view showing an exemplary tag 20 aligned for insertion into a product 22. In an exemplary method of application of tag 20 to product 22, a wire 42 of tag 20 (explained in more detail below) is aligned substantially along an insertion axis 50 so that insertion portion 24 is directed toward product 22 (for example, toward a center of product 22). Moreover, in a product such as a cabbage head, a core 52 of the product 22 is more dense than leafy portions of the cabbage head. Accordingly, in an exemplary embodiment, a portion of a product may be more suitable for insertion and retention of tag 20 than other parts of the product. While the illustrated insertion axis 50 passes through a center portion of product 22, it is contemplated that an insertion direction may differ from that shown. In an exemplary method of use, a user attaches tag 20 to product 22 by piercing a portion of product 22 with insertion portion 24 by force and motion along insertion axis 50. As shown in FIG. 3, in one method of changing an orientation of label portion 26 with respect to product 22, the label portion 26 can be bent along a bending axis 54 that is substantially perpendicular to the insertion axis 50.

Once the insertion portion 24 is attached to the item 22, the label portion 26 may prominently display indicia 28, such as textual, graphical, colored, human or machine readable information (e.g., bar codes, quick response codes, RFID tags), or internet addresses, for example, about the attached product item 22. Label portion 26 may include readable or otherwise discernable information about product 22, such as the produce type, PLU codes, UPC codes, brand information, storage and use instructions, producer information, and the like. Thus, tag 20 provides a convenient and effective mechanism for prominently displaying indicia 28.

Figure 6A:
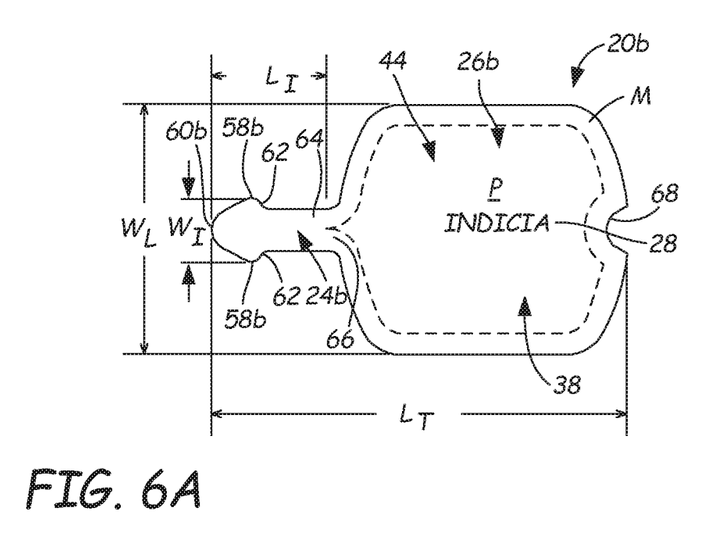
FIG. 6A is a front view of a second exemplary product piercing tag.
Figure 6B:
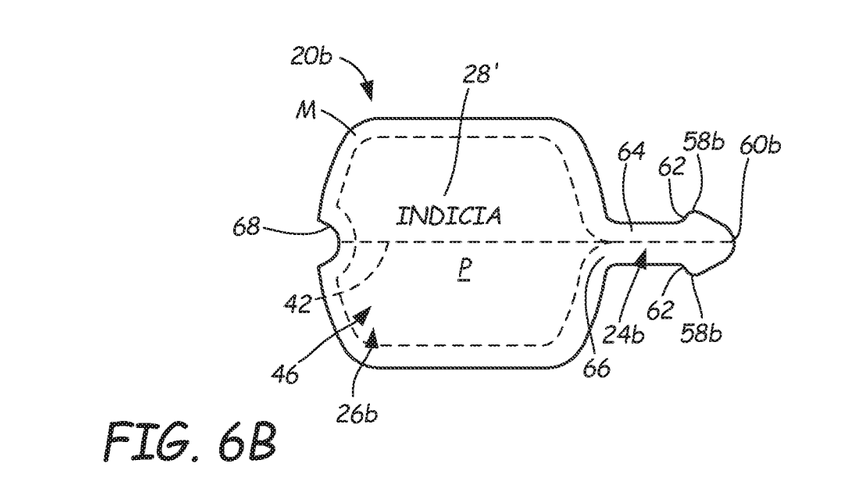
FIG. 6B is a rear view of the tag of FIG. 6A.
Figure 7A:
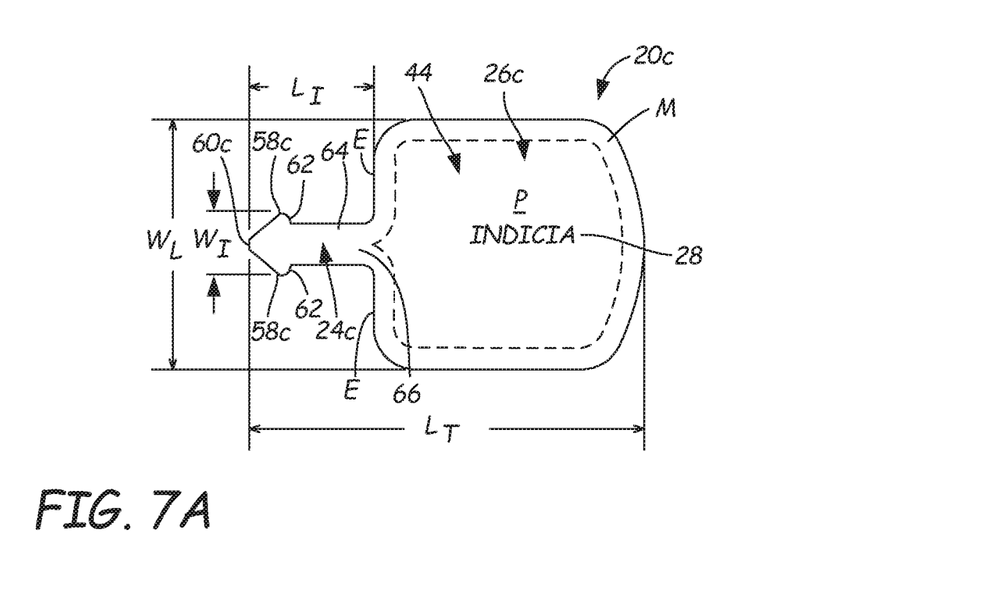
FIG. 7A is a front view of a third exemplary product piercing tag.
Figure 7B:
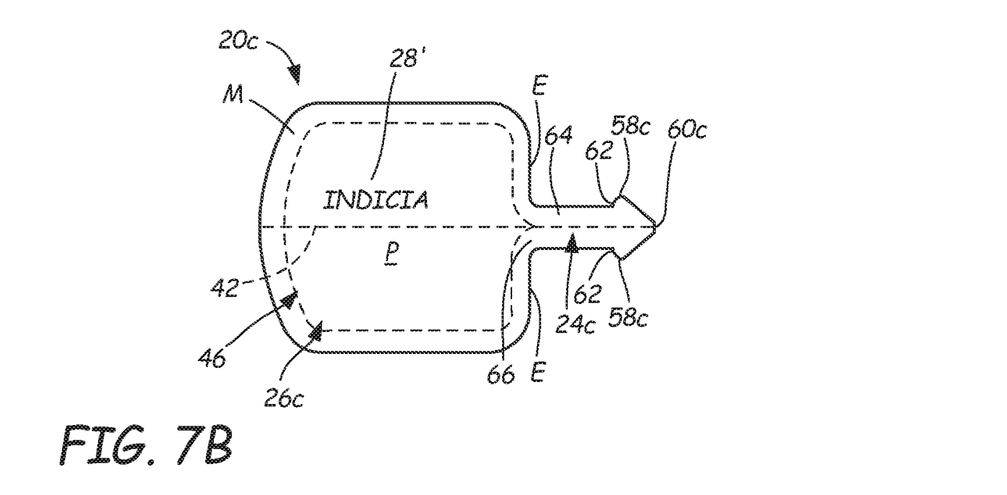
FIG. 7B is a rear view of the tag of FIG. 7A.
Figure 11:
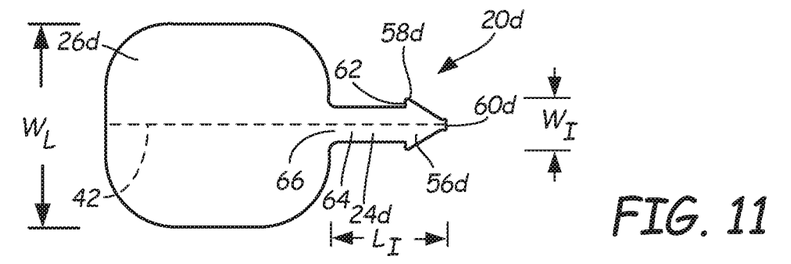
FIG. 11 is a front view of a fourth exemplary product piercing tag.
Figure 12:
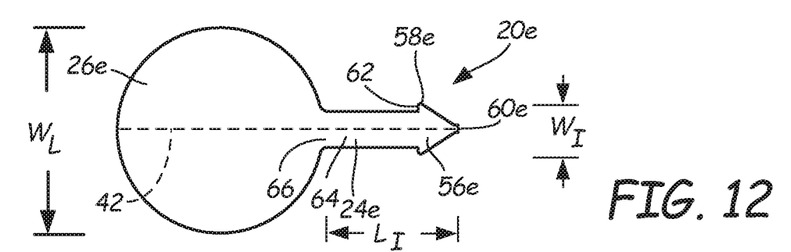
FIG. 12 is a front view of a fifth exemplary product piercing tag.
Figure 13:
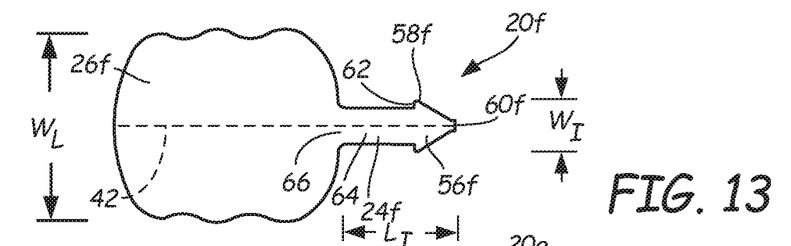
FIG. 13 is a front view of a sixth exemplary product piercing tag.
Figure 14:
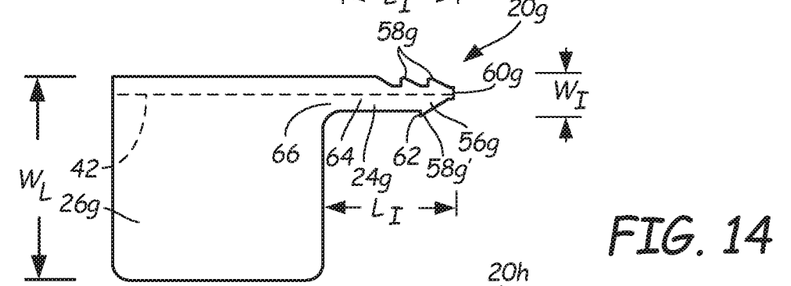
FIG. 14 is a front view of a seventh exemplary product piercing tag.
Figure 15:
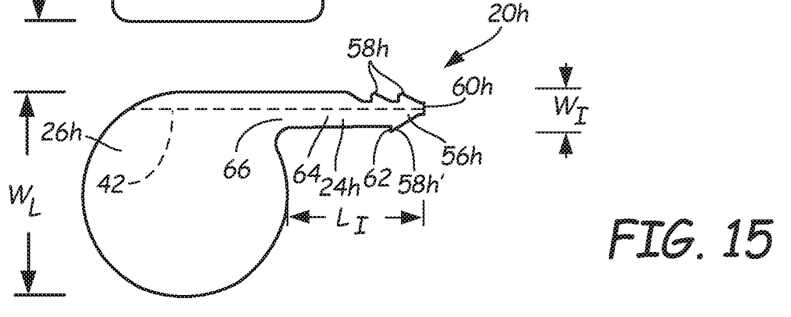
FIG. 15 is a front view of an eighth exemplary product piercing tag.

FIGS. 1-4, 5A and 5B illustrate a first exemplary embodiment for tag 20, labeled as tag 20a. Other shapes for tag 20 are also illustrated as non-limiting examples. For example, FIGS. 6A and 6B show tag 20b; FIGS. 7A and 7B show tag 20c; FIG. 11 shows tag 20d; FIG. 12 shows tag 20e; FIG. 13 shows tag 20f; FIG. 14 shows tag 20g; and FIG. 15 shows tag 20h. While these tags have different shapes and design configurations, they maintain many common attributes. Thus, when discussing their commonalities, the letter designations may be dropped. Moreover, while particular embodiments are illustrated, it is contemplated that other configurations may also be used, including a tag 20 with more than one insertion portion 24 and/or more than one label portion 26, for example.

As shown in tag 20a of FIGS. 1-4, 5A and 5B, insertion portion 24a has an arrow-shaped head 56a with a blunted tip 60a. Insertion head 56a is configured with oppositely extending barbs 58a that extend laterally away from wire 42, which in an exemplary embodiment bisects at least insertion portion 24a of tag 20a, and in some embodiments bisects entire tag 20a. A width $W_I$ of insertion portion 24a is smallest at tip 60a and increases at barbs 58a, which terminate at shoulders 62 to join a shaft 64 of insertion portion 24a, which is joined to label portion 26a. Shaft 64 is shown as having a generally uniform width dimension (between barbs 58a and label portion 26a), but it is contemplated that the shaft width can be non-uniform, such as tapered, serrated or curved, for example. In exemplary embodiments, wire 42 serves to stiffen insertion portion 24a to facilitate its penetration into product 22. Wire 42 may extend into part of label portion 26a or entirely across label portion 26a.

As shown in tag 20b of FIGS. 6A and 6B, insertion portion 24b has an arrow-shaped head 56b with a rounded tip 60b. Insertion head 56b is configured with oppositely extending barbs 58b that extend laterally away from wire 42, which in an exemplary embodiment bisects at least insertion portion 24b of tag 20b, and in some embodiments bisects an entire tag 20b. A width $W_I$ of insertion portion 24b is smallest at tip 60b and increases at barbs 58b, which terminate at shoulders 62 to join shaft 64 of insertion portion 24b, which is joined to label portion 26b. In exemplary embodiments, wire 42 serves to stiffen insertion portion 24b to facilitate its penetration into product 22. Tip 60b is more rounded as compared to tip 60a of tag 20a of FIGS. 5A and 5B. Moreover, label portion 26b has a recess 68 that corresponds in shape to the tip 60b. Accordingly, when multiple tags 20b are formed in a web-based in-line manufacturing process, rows of tags 20b can be nested together, with tips 60b positioned against recesses 68 of adjacent tags 20b. Wire 42 may extend into part of label portion 26b or entirely across label portion 26b.

As shown in tag 20c of FIGS. 7A and 7B, insertion portion 24c has an arrow-shaped head 56c with a blunted tip 60c. Insertion head 56c is configured with oppositely extending barbs 58c that extend laterally away from wire 42, which in an exemplary embodiment bisects at least insertion portion 24c of tag 20c, and in some embodiments bisects an entire tag 20c. A width $W_I$ of insertion portion 24c is smallest at tip 60c and increases at barbs 58c, which terminate at shoulders 62 to join shaft 64 of insertion portion 24c, which is joined to label portion 26c. In exemplary embodiments, wire 42 serves to stiffen insertion portion 24c to facilitate its penetration into product 22. Label portion 26c is shaped differently than label portions 26a or 26b, in that label portion 26c has straighter (less curved) edges E along each side of shaft 64 of insertion portion 24c, wherein those edges E are generally co-linear. Wire 42 may extend into part of label portion 26c or entirely across label portion 26c.

As shown in tag 20d of FIG. 11, insertion portion 24d has an arrow-shaped head 56d with a blunted tip 60d. Insertion head 56d is configured with oppositely extending barbs 58d that extend laterally away from wire 42, which in an exemplary embodiment bisects at least insertion portion 24d of tag 20d, and in some embodiments bisects an entire tag 20d. A width $W_I$ of insertion portion 24d is smallest at tip 60d and increases at barbs 58d, which terminate at shoulders 62 to join shaft 64 of insertion portion 24d, which is joined to label portion 26d. In exemplary embodiments, wire 42 serves to stiffen insertion portion 24d to facilitate its penetration into product 22. Label portion 26d has a rounded rectangular shape with large radius corners. Wire 42 may extend into part of label portion 26d or entirely across label portion 26d.

As shown in tag 20e of FIG. 12, insertion portion 24e has an arrow-shaped head 56e with a blunted tip 60e. Insertion head 56e is configured with oppositely extending barbs 58e that extend laterally away from wire 42, which in an exemplary embodiment bisects at least insertion portion 24e of tag 20e, and in some embodiments bisects an entire tag 20e. A width $W_I$ of insertion portion 24e is smallest at tip 60e and increases at barbs 58e, which terminate at shoulders 62 to join shaft 64 of insertion portion 24e, which is joined to label portion 26e. In exemplary embodiments, wire 42 serves to stiffen insertion portion 24e to facilitate its penetration into product 22. Label portion 26e has a circular shape. Wire 42 may extend into part of label portion 26e or entirely across label portion 26e.

As shown in tag 20f of FIG. 13, insertion portion 24f has an arrow-shaped head 56f with a blunted tip 60f. Insertion head 56f is configured with oppositely extending barbs 58f that extend laterally away from wire 42, which in an exemplary embodiment bisects at least insertion portion 24f of tag 20f, and in some embodiments bisects an entire tag 20f. A width $W_I$ of insertion portion 24f is smallest at tip 60f and increases at barbs 58f, which terminate at shoulders 62 to join shaft 64 of insertion portion 24f, which is joined to label portion 26f. In exemplary embodiments, wire 42 serves to stiffen insertion portion 24f to facilitate its penetration into product 22. Label portion 26f has a shape that is symmetrical about wire 42, with a curvilinear perimeter. Wire 42 may extend into part of label portion 26f or entirely across label portion 26f.

As shown in tag 20g of FIG. 14, insertion portion 24g has an arrow-shaped head 56g with a blunted tip 60g. Insertion head 56g is configured with oppositely extending barbs 58g and 58g' that extend laterally away from wire 42, which is offset asymmetrically on one side of label portion 26g and bisects insertion portion 24g. In the illustrated example, barbs 58g on a top portion of insertion portion 24g are more numerous and shaped differently than barbs 58g' on a bottom portion of insertion portion 24g. A width $W_I$ of insertion portion 24g is smallest at tip 60g and increases at barb 58g', which terminates at shoulder 62 to join a shaft 64 of insertion portion 24g, which is joined to label portion 26g. In exemplary embodiments, wire 42 serves to stiffen insertion portion 24g to facilitate its penetration into product 22. Label portion 26g has a substantially square shape. Wire 42 may extend into part of label portion 26g or entirely across label portion 26g.

As shown in tag 20h of FIG. 15, insertion portion 24h has an arrow-shaped head 56h with a blunted tip 60h. Insertion head 56h is configured with oppositely extending barbs 58h and 58h' that extend laterally away from wire 42, which is offset asymmetrically on one side of label portion 26h and bisects insertion portion 24h. In the illustrated example, barbs 58h on a top portion of insertion portion 24h are more numerous and shaped differently than barbs 58h' on a bottom portion of insertion portion 24h. A width $W_I$ of insertion portion 24h is smallest at tip 60h and increases at barb 58h', which terminates at shoulder 62 to join a shaft 64 of insertion portion 24h, which is joined to label portion 26h. In exemplary embodiments, wire 42 serves to stiffen insertion portion 24h to facilitate its penetration into product 22.

Label portion 26*h* has a substantially circular shape. Wire 42 may extend into part of label portion 26*h* or entirely across label portion 26*h*.

As shown in FIGS. 5A-7B and 11-15, various shapes and configurations can be used for the insertion portion 24 and label portion 26 of tag 20. Tag 20 of the present disclosure can have any desired geometry, including those of figures, persons, objects, animals, vehicles, flowers, and other decorative or novelty shapes. The particular geometry for the label portion 26 of tag 20 and its associated insertion portion 24 may be generated with a die cutter, for example.

In exemplary embodiments, wire 42 is positioned longitudinally along a mid-line of shaft 64 of insertion portion 24. In tags 20*a*-20*f*, insertion portion 24 is positioned to essentially bisect tag 20. However, as shown in FIGS. 14 and 15, the insertion portion 24 can also be offset relative to label portion 26. Thus, label portion 26 can be symmetrical or asymmetrical about insertion portion 24. Moreover, different configurations of barbs 58 can be used, which can be symmetrical with respect to wire 42, as shown in FIGS. 5A-7B and FIGS. 11-13. Alternatively, barbs 58 of insertion portion 24 can be asymmetrical with respect to wire 42, as shown in FIGS. 14 and 15. Additionally, as shown in FIGS. 14 and 15, for example, the barbs of a single insertion portion 24 need not be identical.

In the illustrated embodiments, each tag 20 is a relatively flat device, and barbs 58 extend in the same plane as label portion 26. However, it is to be understood that barbs or other features on insertion portion 24 can extend from any angle radiating from the axis of wire 42. Moreover, exemplary embodiments of tag 20 include an insertion head 56 of a different shape than shaft 64 of insertion portion 24. However, it is contemplated that a substantially uniformly wide insertion portion 24 may be used. It has been found that such an insertion portion adequately pierces a product 22 in many instances; however, a barbed insertion head 56 has been found to enhance retention of tag 20 in product 22. Having a relatively narrow tip 60 on insertion portion 24 improves the ease with which insertion portion 24 penetrates a portion of product 22. In an exemplary embodiment of tag 20, a removal load required to separate an inserted tag 20 from a product 22 is greater than a puncture load required to insert the tag 20 into product 22. In exemplary embodiments, a removal load is suitably in a range of about 3 pounds to about 6 pounds. For some applications, it is desirable to remove an intact tag 20 from a product, as shown in FIG. 4. However, for some other applications, a weakened area may be provided at transition area 66 between insertion portion 24 and label portion 26 to allow label portion 26 to be broken off from insertion portion 24. Such a configuration may be desirable where label portion 26 serves as a removable discount coupon, for example. Such a weakened area may be provided with perforations, score lines, and other combinations of partial and full cuts through the tag assembly.

In exemplary embodiments, indicia 28 can be provided on either or both of front surface 44 and rear surface 46 of an assembly 30, 32, 34 of laminated layers from which tag 20 may be produced. Moreover, if at least one of the layers 38, 40 is visually transparent or translucent, indicia 28 can be provided on an interface surface of at least one of the layers 38, 40, to be visible through a facing layer 38, 40. As shown in FIGS. 5A-7B, a margin M can be provided on either or both of front surface 44 and rear surface 46 of label portion 26 around an area designated as a printing "live area" P in which printing or other provision of indicia 28, 28' can be located. Such a margin allows for a lower tolerance in registration of the printing and shaping (i.e., cutting) of tags 20. In exemplary embodiments, printing of indicia 28 on front surface 44 and of indicia 28' on rear surface 46 are provided in registration with each other.

Figure 8:
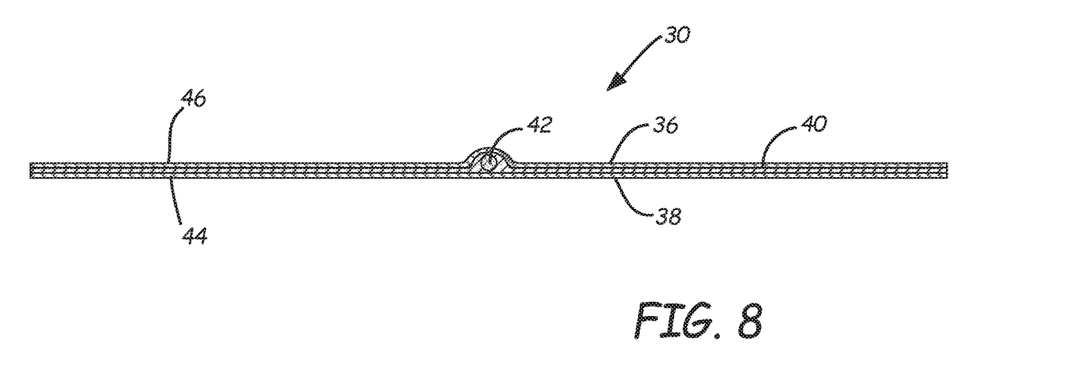
FIG. 8 is a cross-sectional view, taken along line 8-8 of FIG. 5B, showing a first exemplary assembly for production of a product piercing tag.
Figure 9:
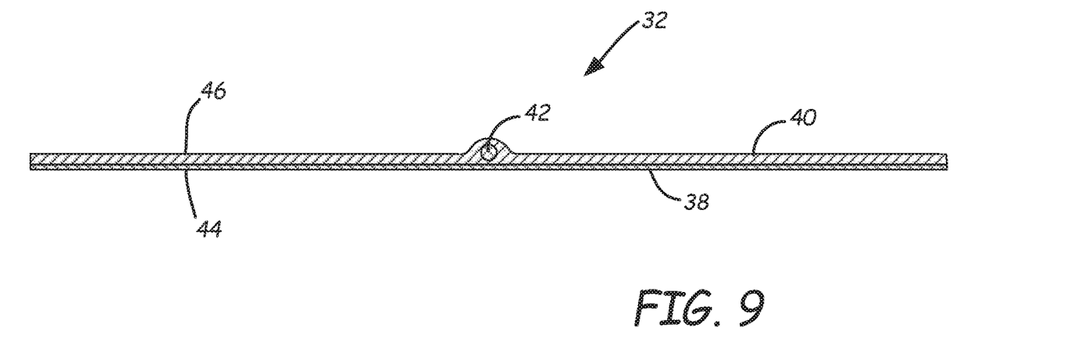
FIG. 9 is similar to FIG. 8, but shows a second exemplary assembly for production of a product piercing tag.
Figure 10:
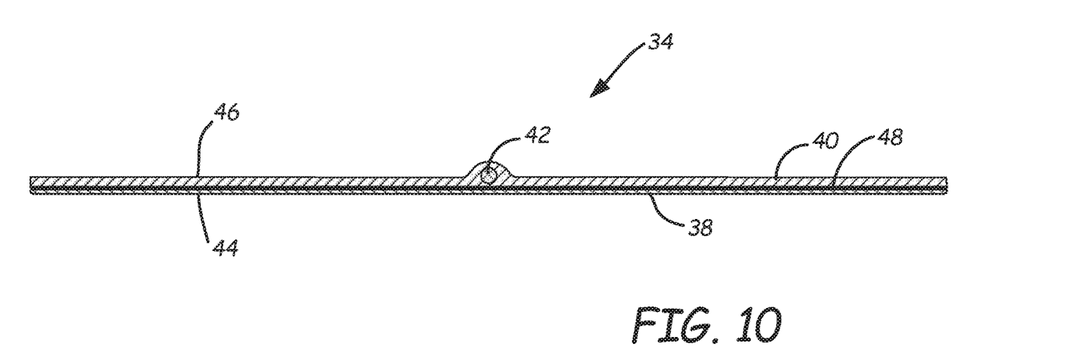
FIG. 10 is similar to FIG. 8, but shows a third exemplary assembly for production of a product piercing tag.

As shown in FIGS. 1 and 5A-15, prior to being secured to product 22, tag 20 may be provided in a flat, non-bent state (as shown) or in a partially-bent state (for example, if provided in a roll or spooled form). FIG. 8 is a cross-sectional view of a first exemplary assembly 30 from which tags 20 may be formed. FIG. 9 is a cross-sectional view of a second exemplary assembly 32 from which tags 20 may be formed. FIG. 10 is a cross-sectional view of a third exemplary assembly 34 from which tags 20 may be formed. In exemplary embodiments of tag 20, insertion portion 24 is coextensive with label portion 26. Where tag 20 is formed of assembly 30 of FIG. 8, each of insertion portion 24 and label portion 26 structurally includes rear film layer 36, front film layer 38, polymer layer 40, and wire 42. In exemplary embodiments, wire 42 extends along both insertion portion 24 and label portion 26.

Rear film layer 36 and front film layer 38 are desirably produced from printable materials, such as one or more paper-based materials and/or polymeric materials to present indicia 28 (e.g., textual, graphical, colored, and/or machine readable information). Referring to FIGS. 8-10, indicia 28 may be disposed on either or both of front surface 44 and rear surface 46 of tag assembly 30, 32, 34. Provision of indicia 28, such as by printing, embossing, inlaying, or engraving, for example, can be accomplished before or after the rear film layer 36, front film layer 38, and/or layer 40 are assembled together. While either surface 44, 46 may be positioned toward a viewer, in exemplary embodiments, the surface 44 that does not include a protrusion of wire 42 is considered to be the "front."

In one method suitable for forming assembly 30 of FIG. 8, wire 42 may be disposed on front film layer 38. Polymer material in a softened state (such as molten polymer, for example) for layer 40 can be extruded onto front film layer 38 to encase wire 42. Rear film layer 36 is laid upon layer 40 and wire 42. Assembly 30 can be laminated together by nip rollers that are configured to impart pressure on front surface 44 and rear surface 46. Front film layer 38, layer 40 and rear film layer 36 are desirably produced from polymeric materials that exhibit strong interlayer bonding to each other, thereby forming a durable laminate assembly 30 in which wire 42 is secured between front film layer 38 and rear film layer 36

To form assembly 32 of FIG. 9, wire 42 may be disposed on front film layer 38. Polymer material in a softened state (such as molten polymer, for example) for layer 40 can be extruded onto front film layer 38 to encase wire 42. Assembly 32 can be laminated together by nip rollers that are configured to impart pressure on front surface 44 and rear surface 46 as layer 40 cures. Front film layer 38 and layer 40 are desirably produced from polymeric materials that exhibit strong interlayer bonding to each other, thereby forming a durable laminate assembly 32 in which wire 42 is secured to front film layer 38 via layer 40.

To form assembly 34 of FIG. 10, adhesive layer 48 and wire 42 may be disposed on front film layer 38. Polymer material in a softened state (such as molten polymer, for example) for layer 40 can be extruded onto adhesive layer 48 to encase wire 42. Assembly 34 can be laminated together by nip rollers that are configured to impart pressure on front surface 44 and rear surface 46 as layer 40 cures. Front film layer 38, adhesive layer 48 and layer 40 are desirably produced from polymeric materials that exhibit strong interlayer bonding to each other, thereby forming a durable laminate assembly 34 in which wire 42 is secured to front film layer 38 via adhesive layer 48 and layer 40.

Many methods can be used to form assemblies 30, 32, 34 and tags 20 therefrom. For example, in one method, components of the assemblies 30, 32, 34 are laminated together, and the shapes of individual tags 20 are cut from the assemblies post-lamination. In another formation, film layers 36, 38 and wire 42 are assembled in a mold, and a resin for layer 40 is injected into the mold. In yet another formation method, each of the components of tag 20 is cut into shape before the components are assembled together post-cutting. Insertion portion 24 and label portion 26 may be integrally formed together in a continuous, in-line manufacturing process, which preferably produces multiple tags 20 in sheet and/or roll form.

In an exemplary embodiment of tag 20, because wire 42 provides added rigidity to insertion portion 24, other areas of tag 20 can be made of a less stiff or rigid material. Particularly suitable materials include those that can be easily printed and retain the integrity of markings thereon without smearing or bleeding, even when wet. Additionally, suitable materials are sufficiently flexible and durable to withstand insertion, bending, and unbending forces without undesired delamination, deterioration, cracking or breakage.

The materials and dimensions (such as thickness, for example) of each of the components of assemblies 30, 32, 34 are selected to impart the requisite rigidity for use of tag 20, as illustrated in FIGS. 1-6. Examples of suitable materials for rear film layer 36 and front film layer 38 include extrudable polymeric materials, such as polyolefins (e.g., low-density polyethylene, high-density polyethylene, polyethylene and combinations thereof). A suitable thickness for each of film layers 36, 38 ranges from about 0.002 inch to about 0.008 inch, for example.

Examples of suitable materials for layer 40 include polypropylene or polyethylene resins. A material for layer 40 is preferably selected to be chemically similar to, and process compatible with, the materials for rear film layer 36, front film layer 38, and/or adhesive layer 48 to provide strong bonds therebetween. Suitable properties for the material of layer 40 include a hardness range of about 90 Rockwell R to about 110 Rockwell R; a tensile strength range of about 3500 psi to about 7500 psi; and elongation at yield of about 5% to about 20%, for example. In exemplary embodiments, the material of layer 40 is clear or neutral in color.

Examples of suitable materials for adhesive layer 48 include hot melt adhesives and acrylic adhesives. Such materials are flexible, to allow for bending without cracking. Suitable materials are not tacky at retail temperatures (such as temperatures in a freezer case, refrigerator case, warming case, or room temperature, for example). In some embodiments of assembly 34, layer 48 forms a destructive bond between front film layer 38 and polymer layer 40 having a greater than 1000 grams force (gf) peel strength. Adhesive layer 48 desirably has a neutral color and is less than about 0.008 inch thick.

Wire 42 is a metallic or polymeric wire that desirably provides good dead-fold properties, as well as high break resistance. For example, in one embodiment, wire 42 is a metallic wire (a stainless steel or aluminum wire, for example). However, metal wires may be undesirable for use in some applications. For example, when food is commercially packaged for distribution to the public, it is desirable for the packaging to allow inspection of packaged food for contamination by foreign objects. One common method of inspecting food products involves the use of metal detectors to confirm that no metal scrap or shards have inadvertently been incorporated in the food product during production or packaging of the food product.

Tags with metal wires, when attached to food products, preclude such use of a metal detector, since each tag that is attached to the food product would typically generate a response by the metal detector. Thus, rather than simply detecting the presence of any undesired metal in the packaged food, the metal detector would also indicate, for each package, the presence of the metal wire on the tag.

Accordingly, in other embodiments, wire 42 is a polymeric wire, such as a single component wire or a multiple component wire. Suitable polymeric materials for wire 42 include polyethylenes (e.g., high-density polyethylenes), and those disclosed in U.S. Pat. Nos. 6,372,068; 6,673,413 and 7,011,879. In embodiments in which the polymer material is a high-density polyethylene, the high-density polyethylene desirably has a weight-average molecular weight ranging from about 130,000 to about 150,000. The high density polyethylene also desirably has a density of at least about 0.94 grams/cubic-centimeter, as measured pursuant to ASTM D792-08. A suitable tensile strength or rigidity for wire 42 ranges from about 90 ksi to about 125 ksi, for example (about 90,000 psi to about 125,000 psi (pounds per square inch)). A suitable diameter for wire 42 ranges from about 0.5 mm to about 0.8 mm (about 20 gauge to about 24 gauge), for example. In exemplary embodiments, a diameter of wire 42 is significantly less than a width $W_I$ of insertion portion 24.

In some embodiments, the material of wire 42 may also include additional additives, such as colorants, fillers, dead-fold modifiers, biodegradable additives (e.g., oxo-biodegradable additives), toughness modifiers, bond promoters, ultraviolet-stabilizers, and the like. In these embodiments, examples of suitable concentrations of the additives in the material range from about 0.01% by weight to about 10% by weight, based on an entire weight of the material. In one embodiment, suitable concentrations of the additives in the material range from about 0.05% by weight to about 5% by weight, based on an entire weight of the material. The materials discussed above accordingly constitute the remainder of the material for wire 42.

While illustrated with a single wire 42, in other embodiments, insertion portion 24 may include more than one wire and/or other polymeric and/or metallic insertion devices, such as pins, barbs, and the like. Moreover, while the illustrated embodiments of tag 20 show a single insertion portion 24, it is contemplated that multiple insertion portions 24 may extend from label portion 26.

In use, an exemplary insertion portion 24 can withstand puncture loads for insertion into various products without substantial deformation. For example, as illustrated in FIGS. 1, 2, 5 and 6, piercing of the core 52 of a cabbage product 22 requires a puncture load range of about 1.5 pounds to about 2.5 pounds. In exemplary embodiments, a length $L_I$ of insertion portion 24 (parallel to wire 42) is about 0.25 inch to about 1.0 inch. A length $L_I$ of equal to or greater than about 0.25 inch allows an adequate insertion distance into a product 22. However, a length $L_I$ of greater than about 1.0 inch is more likely to result in buckling of shaft 64 during insertion. In exemplary embodiments, a width $W_I$ of insertion portion 24 is in a range of about 0.25 inch to about 0.50 inch and in some cases is about 0.375 inch.

Some exemplary, non-limiting embodiments of a tag 20 configured to be inserted into a product 22 are described. The tag 20 has a length $L_T$ and includes a label portion 26 having a first width $W_L$. An insertion portion 24 extends from the label portion 26 and has a second width $W_I$ that is less than the first width $W_L$. The insertion portion 24 has a length $L_I$. An elongated wire 42 extends along the length $L_I$ of the insertion portion 24 to at least a part of the label portion 26. The tag 20 has sufficient rigidity to enable a user to hold the label portion 26 and force the insertion portion 24 into the product 22.

In an exemplary embodiment, the tag 20 includes indicia 28 disposed on the label portion 26. In an exemplary embodiment, tag 20 includes first indicia 28 disposed on a first surface 44 of the label portion 26 and second indicia 28' disposed on a second opposing surface 46 of the label portion 26. First indicia 28 and second indicia 28' may be the same or different indicia. In an exemplary embodiment, the label portion 26 and insertion portion 24 are integrally fabricated from a first sheet 28 and a polymeric layer 40 adhered to the first sheet 28 such that the wire 42 is encased within the polymeric layer 40, as shown in FIGS. 8-10. In an exemplary embodiment, the tag 20 includes a second sheet 36 adhered to the polymeric layer 40 opposite the first sheet 38, as shown in FIG. 8. In an exemplary embodiment, the polymeric layer 40 is formed from a material having a hardness range of about 90 Rockwell R to about 110 Rockwell R. In an exemplary embodiment, at least one of the first sheet 38 and second sheet 36 includes a polymer.

In an exemplary embodiment, the wire 42 exhibits a dead-fold property. In an exemplary embodiment, the insertion portion 24 includes an arrow-shaped head 56. In an exemplary embodiment, the label portion 26 is symmetric about the wire 42, as shown in FIGS. 1-13. In an exemplary embodiment, the wire 42 has a tensile strength in a range from about 90 ksi to about 125 ksi.

In another aspect, a method of attaching a tag 20 to a product 22 is described. The method includes holding the label portion 26 and forcing the insertion portion 24 into the product 22, as shown in FIGS. 1 and 2. In an exemplary embodiment, the method includes bending the tag 20 at a transition area 66 between the label portion 26 and the insertion portion 24 to change an orientation of the label portion 26 with respect to the product 22, as shown in FIG. 3. In an exemplary embodiment, the bending is performed along a bending axis 54 that is substantially perpendicular to the length $L_I$ of the insertion portion 24. In an exemplary embodiment, a puncture load of forcing the insertion portion 24 into the product 22 is in a range of about 1.5 pounds to about 2.5 pounds.

Although the subject of this disclosure has been described with reference to several embodiments, workers skilled in the art will recognize that changes may be made in form and detail without departing from the scope of the disclosure. In addition, any feature disclosed with respect to one embodiment may be incorporated in another embodiment, and vice-versa. All references mentioned in this disclosure are hereby incorporated by reference.

The invention claimed is:

1. A tag configured to be inserted into a product, the tag including:
   a label portion having a first width;
   an insertion portion:
      extending from the label portion;
      having a second width that is less than the first width; and
      having a length;
   wherein an elongated wire extends along the length of the insertion portion to at least a part of the label portion, wherein the wire exhibits a dead-fold property; the tag having sufficient rigidity to enable a user to hold the label portion and force the insertion portion into a body of the product, the tag comprising a material having a hardness range of about 90 Rockwell R to about 110 Rockwell R.

2. The tag of claim 1 including indicia disposed on the label portion.

3. The tag of claim 1 including first indicia disposed on a first surface of the label portion and second indicia disposed on a second opposing surface of the label portion.

4. The tag of claim 1 wherein the label portion and insertion portion are integrally fabricated from a first sheet and a polymeric layer adhered to the first sheet such that the wire is encased within the polymeric layer.

5. The tag of claim 4 including a second sheet adhered to the polymeric layer opposite the first sheet.

6. The tag of claim 5 wherein at least one of the first sheet and second sheet includes a polymer.

7. The tag of claim 1 wherein the insertion portion includes an arrow-shaped head.

8. The tag of claim 1 wherein the label portion is symmetric about the wire.

9. A tag configured to be inserted into a product, the tag including:
   a label portion having a first width;
   an insertion portion:
      extending from the label portion;
      having a second width that is less than the first width; and
      having a length;
   wherein an elongated wire extends along the length of the insertion portion to at least a part of the label portion, wherein the wire has a tensile strength in a range of about 90 ksi to about 125 ksi, wherein the wire exhibits a dead-fold property;
   the tag having sufficient rigidity to enable a user to hold the label portion and force the insertion portion into a body of the product.

10. The tag of claim 9 including indicia disposed on the label portion.

11. The tag of claim 9 including first indicia disposed on a first surface of the label portion and second indicia disposed on a second opposing surface of the label portion.

12. The tag of claim 9 wherein the label portion and insertion portion are integrally fabricated from a first sheet and a polymeric layer adhered to the first sheet such that the wire is encased within the polymeric layer.

13. The tag of claim 12 including a second sheet adhered to the polymeric layer opposite the first sheet.

14. The tag of claim 13 wherein at least one of the first sheet and second sheet includes a polymer.

15. A method of attaching a tag to a product, the tag including:
   a label portion having a first width;
   an insertion portion:
      extending from the label portion;
      having a second width that is less than the first width; and
      having a length;
   wherein an elongated wire extends along the length of the insertion portion to at least a part of the label portion;
   the method including:
      holding the label portion;
      forcing an end of the insertion portion into a body of the product;
      retaining the end of the insertion portion in the body of the product; and bending the tag at a transition area between the label portion and the insertion portion to change an orientation of the label portion with respect to the product.

16. The method of claim 15 wherein the bending is performed along a bending axis that is substantially perpendicular to the length of the insertion portion.

17. The method of claim 15 wherein a puncture load of forcing the insertion portion into the product is in a range of about 1.5 pounds to about 2.5 pounds.

\* \* \* \* \*